(12) United States Patent
Berretta et al.

(10) Patent No.: US 11,772,730 B2
(45) Date of Patent: Oct. 3, 2023

(54) SYSTEM AND METHOD FOR ESTIMATING A BEHAVIOR OF A CYCLIST ON A BICYCLE AND A QUALITY OF A ROAD ALONG A PATH FOLLOWED BY THE BICYCLE

(71) Applicant: Zehus S.p.A., Milan (IT)

(72) Inventors: Daniele Berretta, Milan (IT); Marcello Segato, Milan (IT); Paolo Lisanti, Milan (IT)

(73) Assignee: ZEHUS S.P.A., Milan (IT)

( * ) Notice: Subject to any disclaimer, the term of this patent is extended or adjusted under 35 U.S.C. 154(b) by 1032 days.

(21) Appl. No.: 16/491,245

(22) PCT Filed: Feb. 28, 2018

(86) PCT No.: PCT/IB2018/051274
§ 371 (c)(1),
(2) Date: Sep. 5, 2019

(87) PCT Pub. No.: WO2018/163027
PCT Pub. Date: Sep. 13, 2018

(65) Prior Publication Data
US 2020/0010146 A1   Jan. 9, 2020

(30) Foreign Application Priority Data

Mar. 7, 2017 (IT) .................. 102017000025374

(51) Int. Cl.
*B62H 5/00* (2006.01)
*B62H 5/20* (2006.01)
(Continued)

(52) U.S. Cl.
CPC ............ *B62H 5/00* (2013.01); *B62H 5/20* (2013.01); *B62J 45/412* (2020.02); *B62J 45/414* (2020.02); *B62M 6/50* (2013.01); *G07C 1/10* (2013.01)

(58) Field of Classification Search
CPC ......... B62M 6/50; B62J 45/412; B62J 45/414
See application file for complete search history.

(56) References Cited

U.S. PATENT DOCUMENTS

2017/0115319 A1 * 4/2017 Ookubo ................... B62J 45/20
2017/0328726 A1   11/2017 Matsuzawa et al.
(Continued)

FOREIGN PATENT DOCUMENTS

| WO | 2014113874 A1 | 7/2014 |
| WO | 2016079614 A1 | 5/2016 |
| WO | 2016111068 A1 | 10/2017 |

OTHER PUBLICATIONS

International Search Report and Written Opinion dated Jun. 8, 2018 for counterpart International Patent Application No. PCT/IB2018/051274.

*Primary Examiner* — Minnah L Seoh
*Assistant Examiner* — Harold Eric Pahlck, III
(74) *Attorney, Agent, or Firm* — SHUTTLEWORTH & INGERSOLL, PLC; Timothy Klima

(57) ABSTRACT

A system for estimating the behavior of a cyclist on a bicycle and/or of the quality of a road along a path followed by said bicycle, comprising: a sensor configured to detect the vertical acceleration of the bicycle and to supply a signal representative of the same; a module for estimating vertical impacts configured to: receive at the input the signal representative of the vertical acceleration for a determined time; acknowledge one or more first portions of the signal representative of the vertical acceleration, containing peaks due to vertical impacts, and one or more second portions of the
(Continued)

signal representative of the vertical acceleration devoid of said peaks due to vertical impacts, wherein said one or more first portions of the signal representative of the vertical acceleration are indicative of the cyclist's behavior, and said one or more second portions of the signal representative of the vertical acceleration are indicative of the road quality.

14 Claims, 4 Drawing Sheets

(51) Int. Cl.
  *B62M 6/50* (2010.01)
  *G07C 1/10* (2006.01)
  *B62J 45/412* (2020.01)
  *B62J 45/414* (2020.01)

(56) References Cited

U.S. PATENT DOCUMENTS

2018/0264905 A1* 9/2018 Kimura .................. B62J 45/414
2020/0122633 A1* 4/2020 Hammock ........... B60Q 1/2673
2020/0171906 A1* 6/2020 Murakami ............. B62K 25/04

* cited by examiner

SYSTEM AND METHOD FOR ESTIMATING A BEHAVIOR OF A CYCLIST ON A BICYCLE AND A QUALITY OF A ROAD ALONG A PATH FOLLOWED BY THE BICYCLE

This application is the National Phase of International Application PCT/IB2018/051274 filed Feb. 28, 2018 which designated the U.S.

This application claims priority to Italian Patent Application No. 102017000025374 filed Mar. 7, 2017, which application is incorporated by reference herein.

TECHNICAL FIELD

The present invention relates to a system and a method for estimating the behavior of a cyclist on a bicycle and/or of the quality of a road along a path followed by said bicycle.

PRIOR ART

With the development in cities of so-called bike sharing services, in particular of municipal bike sharing, there has arisen a need to optimally manage the bicycles given to users to share. A first problem regards the maintenance of the bicycles, which are often carelessly treated by users and frequently damaged, without it being possible to trace the user who brought about the damage or the causes thereof. A further problem posed is the optimization of cycle lanes, both in terms of definition of the paths and maintenance thereof, which is left up to purely visual and empirical evaluations.

Cycle lanes thus frequently follow non-optimal paths and are moreover in a state of precarious maintenance. For example, cycle lanes often have unrepaired potholes or bumps that may constitute a hazard for cyclists.

OBJECT OF THE INVENTION

The object of the present invention is to provide a system and a method enabling an estimation of the behavior of a cyclist during the use of a bicycle, in particular but not exclusively a bicycle supplied by a bike sharing service. In this manner, it is for example possible to determine which user has caused damage to the bicycle and in what way.

Moreover, it is possible to monitor users who, despite not having caused damage, have engaged in unsuitable and potentially dangerous behavior.

This information can be exploited, for example, to issue fines to the bike sharing user, or also incentives in the case of virtuous behavior.

A further object of the present invention is to provide a system and a method that can be employed, alternatively or in addition to estimating the cyclist's behavior, to map roads, for example cycle lanes. The mapping can be exploited to define optimal paths for cycle lanes, or also to monitor the condition thereof, or also of roads not dedicated to cycle lanes.

These and other objects are achieved by a system and a method for estimating the behavior of a cyclist on a bicycle and/or the quality of a road along a path followed by said bicycle according to the present disclosure.

The present disclosure also defines possible advantageous embodiments of the invention.

BRIEF DESCRIPTION OF THE DRAWINGS

To enable a better understanding of the invention and appreciation of the advantages thereof, several non-limiting example embodiments shall be described herein below, referring to the attached figures, of which.

DETAILED DESCRIPTION OF PREFERRED EMBODIMENTS OF THE INVENTION

Figure 1A:
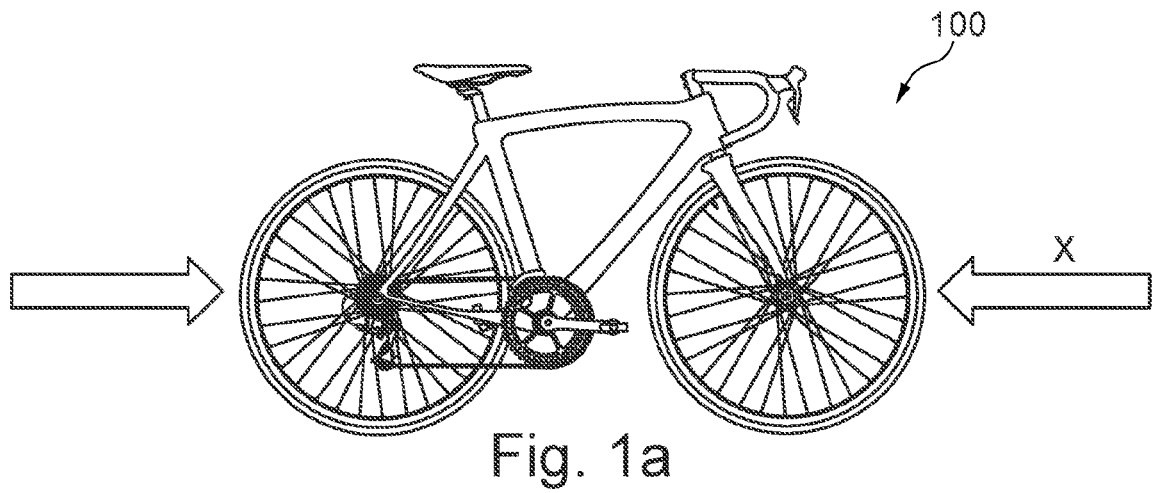
FIGS. 1a-1c are schematic illustrations of a bicycle and some impacts it may be subject to during use along a set of three axes x-y-z integral with the bicycle.
Figure 1B:
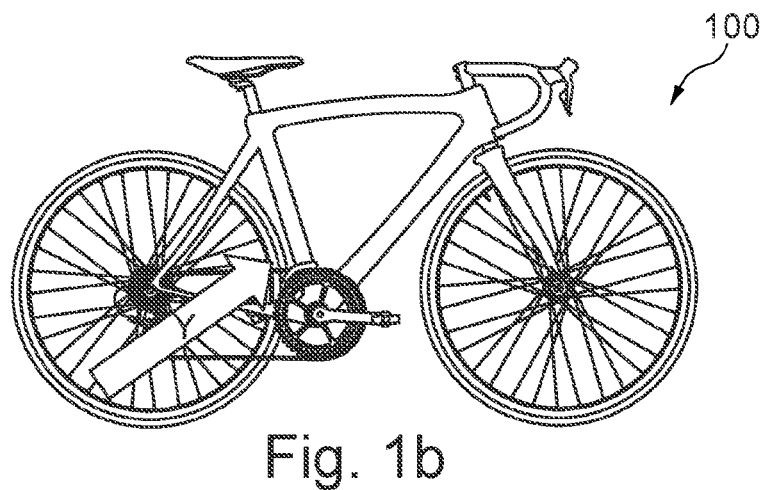
Figure 1C:
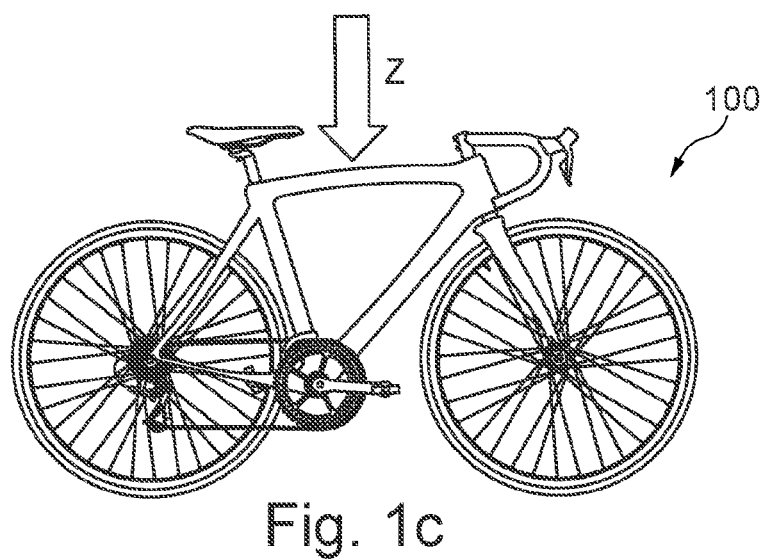

With reference to FIGS. 1a-1c, they schematize impacts a bicycle 100 may meet with during use by a cyclist. The bicycle may meet with longitudinal impacts, i.e. along a direction x, for example if hurled quickly against something that is situated in front of or behind it (FIG. 1a). The bicycle 100 may meet with lateral impacts, i.e. along a direction y, for example if it is thrown violently to the ground by the cyclist (FIG. 1b). Furthermore, the bicycle 100 may meet with vertical impacts, i.e. along a direction z, for example if the cyclist jumps vertically on the bicycle itself/on the pedals or jumps with the bicycle (FIG. 1c). Said axes x-y-z are assumed to be integral with the bicycle itself.

Each of these impacts results in an acceleration that can be detected by a specific sensor. The detection of one or more impacts of this kind during use of the bicycle by a cyclist can be considered indicative of an incorrect behavior of the cyclist him/herself.

For the purpose of detecting said impacts, a system for estimating a cyclist's behavior and/or the road quality along a path followed by the bicycle, in accordance with the invention, comprises one or more inertial sensors, to be applied on the bicycle itself, and suitable for detecting the longitudinal acceleration Ax, and/or the lateral acceleration Ay, and/or the vertical acceleration Az, and for supplying signals representative of the same.

With reference to the longitudinal Ax and lateral Ay accelerations, the signals detected by the sensors, where provided, will generally be constant or in any case variable with a frequency correlated to the pedal-thrust cadence (if the bicycle is traveling rectilinearly at a constant speed) or, with reference in particular to the lateral acceleration Ay, they will show low-frequency variations when the bicycle turns a bend and bends accordingly. In the event of an impact, the signals will show peaks with respect to the described trend, which can be identified.

Figure 2:
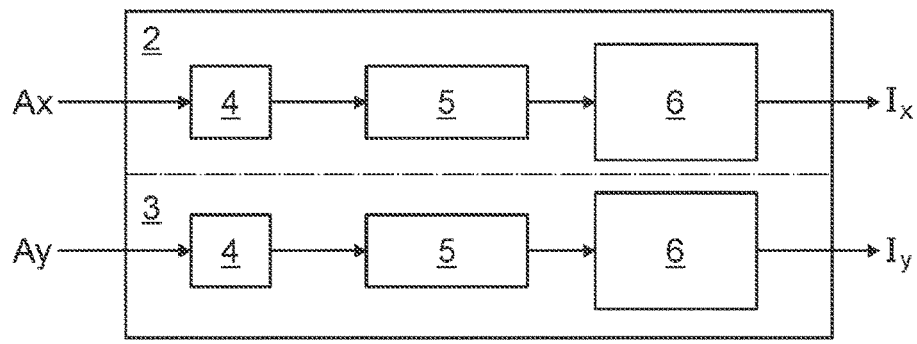
FIG. 2 is a block diagram of a module for estimating longitudinal impacts and a module for estimating lateral impacts of the system according to a possible embodiment.

FIG. 2 represents a block diagram of a module 2 for estimating longitudinal impacts and of a module 3 for estimating lateral impacts of the system according to a possible embodiment of the invention. With reference, for example, to the module 2, it receives at the input the signal representative of the longitudinal acceleration Ax and comprises: a module 4 for calculating the absolute value of the input signal, a band-pass filter 5 which filters said signal in a predefined band, and a peak detecting module 6, capable, precisely, of detecting peaks in the signals not due to the normal operation of the bicycle. The peak detecting module 6 supplies at the output a value Ix representative of the impact along the longitudinal direction x, which can be, for example, equal or proportional to the amplitude of the peak detected along the direction x.

The module 3 can be configured in a wholly analogous manner in order to supply at the output a value Iy representative of the impact along the lateral direction Ay, which may be, for example, equal or proportional to the amplitude of the peak detected along the direction y. It should be noted that, according to the embodiments, the system according to invention can comprise one, both or neither of the modules 2 and 3.

With reference now to the vertical acceleration Az, this can be exploited not only, as said, to detect the vertical impacts on the cyclist's part, but also to estimate the quality of the path along which the bicycle moves.

In fact, the vertical acceleration Az can be likewise indicative of surface roughness or irregularity, or bumps or potholes on the ground, which are detected by the inertial sensor of the vertical acceleration Az.

Advantageously, for this purpose the system comprises a module 7 for estimating vertical impacts which is exploited to isolate, in the vertical acceleration signal Az, the peaks due to the cyclist's behavior. Once such peaks have been identified, the remaining portions of the vertical acceleration signal Az acquired over time and/or space can be considered due not to the cyclist's behavior but rather to the road conditions, and thus be analyzed for the purpose of estimating road quality.

Therefore, the module 7 for estimating vertical impacts is configured to:

receive at the input the signal representative of the vertical acceleration for a determined time (this time can for example correspond to the time of use of the bike sharing service by the user cyclist from when he or she picks up the bicycle to when he or she returns it);

acknowledge one or more first portions of the signal representative of the vertical acceleration Az containing peaks due to vertical impacts of the cyclist, and one or more second portions of the signal representative of the vertical signal devoid of said peaks due to vertical impacts of the cyclist.

The first portions of the signal will be representative of the cyclist's behavior, whereas the second portions will be representative of the road quality.

Figure 3A:
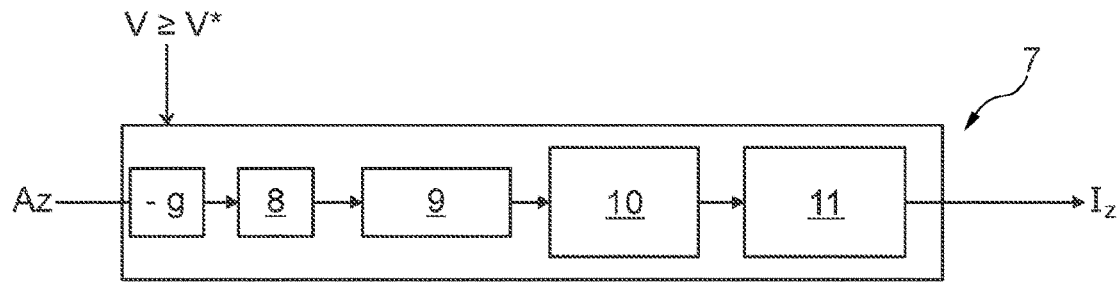
FIGS. 3a-3b are block diagrams of a module for estimating vertical impacts of the system according to a possible embodiment under two different operating conditions.
Figure 3B:
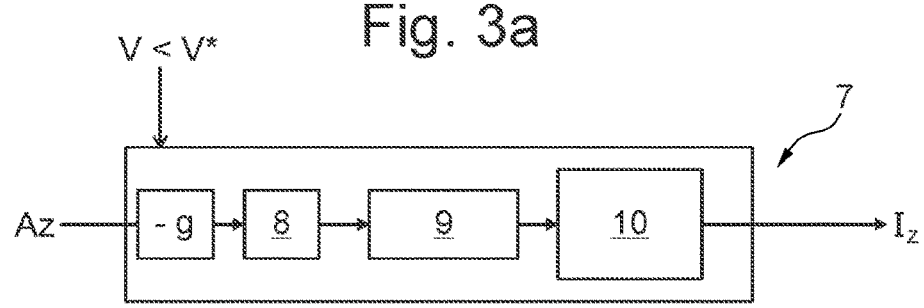

FIGS. 3a and 3b show block diagrams that illustrate a possible functioning of the module 7 for estimating vertical impacts.

According to this example embodiment, the module 7, in addition to the signal representative of the vertical acceleration Az, further receives at the input a signal representative of the speed v of the bicycle. For this purpose, the system comprises a sensor for detecting the longitudinal bicycle speed, suitable for supplying a signal representative of the same. For example, this sensor can comprise an angular speed sensor to be applied on the front or rear wheel of the bicycle, from which it is possible to obtain the linear speed v by multiplying the detected angular speed by the wheel radius.

The bicycle speed v is compared with a threshold speed value v*, preferably close to zero, in order to distinguish a situation in which the bicycle is stationary or moving forward under conditions not at the cruising speed (for example, if the cyclist is pushing it by hand), as compared to the conditions at cruising speed. In the former case, in fact, a peak in vertical acceleration will almost certainly be due to impacts of the cyclist, whereas in the latter case it will be necessary to distinguish the impacts of the cyclist from peaks in vertical acceleration due to irregularities on the ground.

If the bicycle speed v is greater than or equal to the threshold value v*, the module 7 can act, for example, according to the scheme illustrated in FIG. 3a, whereas if the bicycle speed v is lower than the threshold value v*, the module 7 can act, for example, according to scheme illustrated in FIG. 3b.

In accordance with the embodiment illustrated in FIG. 3b, the module 7, in the event that the speed v is lower than the threshold value v*, substantially acts according to what was already said with reference to the modules 2 and 3 in relation to the longitudinal Ax and lateral Ay accelerations. In particular, it receives at the input the signal representative of the vertical acceleration Az and comprises: a module 8 for calculating the absolute value of the signal at the input, from which the value of gravitational acceleration has preferably been subtracted (−g), a band-pass filter 9 which filters said signal in a predefined frequency band, and a peak detecting module 10, capable, precisely, of detecting peaks in the signal. The peak detecting module 10 supplies at the output a value Iz representative of the impact along the longitudinal direction z, which can be, for example, equal or proportional to the amplitude of the peak detected along the direction z.

In the event that the speed v is greater than or equal to the threshold value v*, in accordance with the embodiment illustrated in FIG. 3a, the module 7 is configured and acts in a manner analogous to what was described previously, but further comprises a module 11 for evaluating the shape coherence of the detected peak. Said module 11, in particular, is configured to compare the trend in the peak of the vertical acceleration signal Az with predetermined trends representative of vertical impacts stored in the system in a specific memory module (not illustrated). If the module 11 detects coherence, the peak will be considered a vertical impact of the cyclist. The peak detecting module 10 will thus supply at the output a value Iz representative of the impact along the longitudinal direction z, which can be, for example, equal or proportional to the amplitude of the peak detected along the direction z.

In this manner, with reference to the schematic illustration of FIG. 4, the vertical acceleration signal Az in the time t will be divided into first portions 12, in which the impacts due to the cyclist are present and are therefore indicative of the cyclist's behavior, and in second portions 13, where such impacts due to the cyclist are not present and the signal is therefore representative of the road quality, which in turn, as will be explained, might contain peaks of a different nature, due, for example, to road bumps. The detection of impacts of the cyclist, possibly also only of vertical impacts, may already in itself be representative of the cyclist's behavior. However, the system according to invention, in accordance with possible further embodiments, can consider further parameters.

In accordance with one embodiment, the system is configured to detect impacts on the pedals by the cyclist, i.e. impacts given on the pedals by the cyclist while pedaling. According to this embodiment, the system comprises a sensor for detecting the angular speed $\omega_{wheel}$ of the wheel to which the transmission, for example the chain, is connected, the transmission being connected in turn to the bicycle pedals. The system further comprises a sensor for detecting the pedal-thrust rate $\omega_{cadence}$. For example, this sensor can be connected to the pedals or to the free wheel mechanism of the wheel. With reference, for example, to an exclusively human-powered bicycle, i.e. not a pedal-assisted bicycle, under normal conditions of travel, where the bicycle moves forward by virtue of the traction imparted by the cyclist, the wheel angular speed coincides with the free wheel speed, in turn correlated to the pedal-thrust rate through a transmission ratio. In the event that the cyclist applies impacts on the pedals, the difference between the free wheel angular speed and the wheel angular speed will show abrupt peaks.

Figure 5:
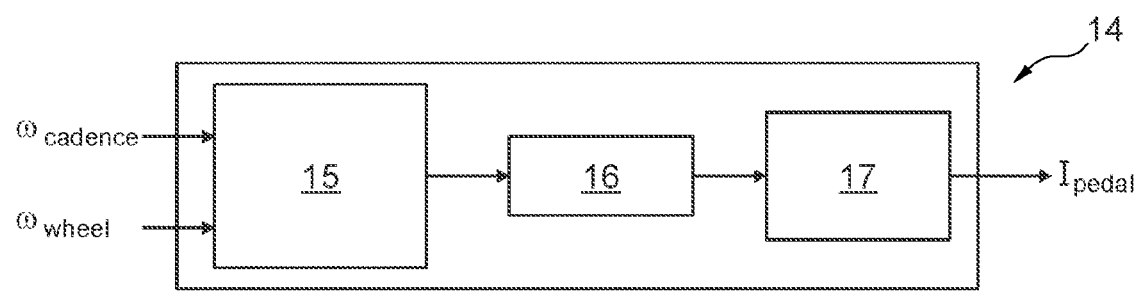
FIG. 5 is a block diagram of a module for estimating impacts on the pedals of the system according to a possible embodiment.

FIG. 5 represents a block diagram of a module 14 for estimating impacts on the pedals according to a possible embodiment. Said module 14 receives at the input the signals representative of the wheel angular speed $\omega_{wheel}$ and the pedal-thrust angular speed/free wheel angular speed to $\omega_{cadence}$. The module 14 comprises a module 15 for verifying the coherence between the wheel angular speed $\omega_{wheel}$ and the pedal-thrust angular speed/free wheel angular speed $\omega_{cadence}$. Said module 15 compares the two speeds and verifies whether the profiles thereof are compatible with an ordinary traction condition or compatible with an impact condition, according to what was said above. In particular, if the wheel speed coincides with the free wheel speed, there is a condition of traction, i.e. where the free wheel is engaged, whilst if the wheel speed is much greater than the free wheel speed, there is a condition where the free wheel is not engaged. The impact corresponds to an abrupt transition from an unengaged to an engaged condition of the free wheel.

Based on the trend of the time derivative of the difference between these speeds it is thus possible to identify the impact. The module 14 further comprises a band-pass filter 16 adapted to filter the time derivative of the difference between the signals representative of the wheel angular speed and of the free wheel speed. Finally, the module 14 comprises a peak detecting module 17, capable, precisely, of detecting peaks in the output signal from the band-pass filter 16 and of supplying at the output a value $I_{pedal}$ representative of the impact on the pedals, which can be for example equal or proportional to the amplitude of the detected peak.

Figure 6:
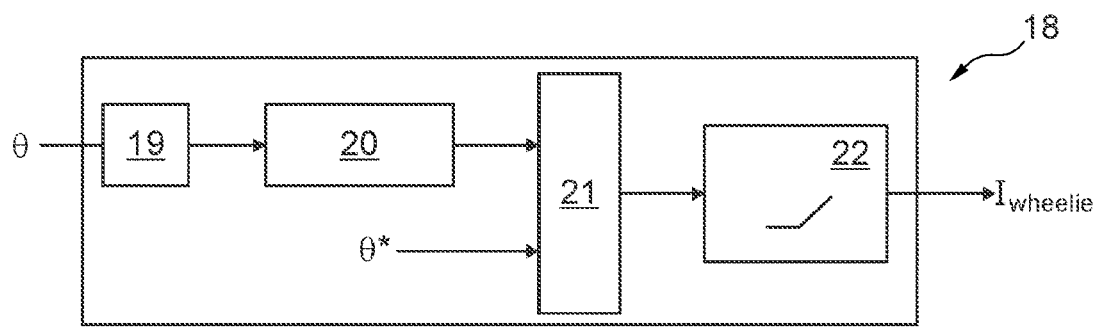
FIG. 6 is a block diagram of a module for estimating wheelies of the system according to a possible embodiment.

In accordance with one embodiment, the system is configured to detect wheelies of the cyclist, that is, rotational impacts around the pitch axis y of the bicycle. According to this embodiment, the system comprises a module for estimating the pitch angle θ, representative, precisely, of wheelies, which can be determined, for example, from the signal supplied by a sensor of the angular pitch speed $\omega_y$. FIG. 6 represents a block diagram of a module 18 for estimating the degree of wheelies according to a possible embodiment. Said module 18 receives at the input the signal representative of the pitch angle θ, estimated, as said, for example, from the angular pitch speed $\omega_y$, and comprises a module 19 for calculating the absolute value of the signal at the input, a low-pass filter 20 which filters said signal, and a comparing module 21, configured to compare the signal representative of the pitch angle θ filtered by the low-pass filter 20 with a value of a threshold pitch angle θ* (selected in such a way as to distinguish normal conditions of a bicycle climbing from a wheelie condition). If the pitch angle θ is greater than the value of the threshold pitch angle θ*, the difference of said values is representative of the wheelie. The comparing module thus supplies at the output a value $I_{wheelie}$ representative of a wheelie, which can be, for example, equal to the difference between the pitch angle θ filtered by the low-pass filter 20 and the value of threshold pitch angle θ*.

Optionally, the module 18 can comprise a ramp generating module 22 which amplifies the difference between the filtered pitch angle θ and the value of the threshold pitch angle θ*, so that the value $I_{wheelie}$ representative of the wheelie will increase in the time in which the impact occurs, that is, it will take into account the fact that the cyclist maintains the bicycle in a wheelie condition for a prolonged time.

According to what was described above, the system is capable of monitoring various input parameters and determining parameters representative of impacts of various kinds, each of which is in itself representative of the cyclist's behavior.

Figure 7:
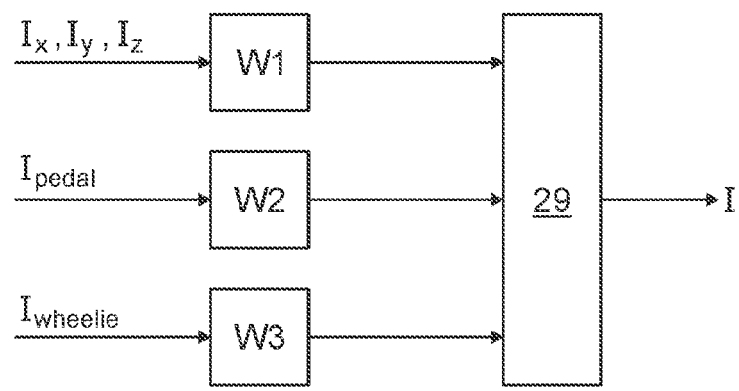
FIG. 7 is a block diagram of a synthesis module of the system according to a possible embodiment.

According to a possible embodiment, the system further comprises a synthesis module 29 configured to supply a unique value representative of the impacts I, obtained, for example, based on the weighed sum according to weights w1, w2, w3 . . . of the magnitudes representative of the impacts calculated according to the method described previously (FIG. 7).

The unique value representative of the impacts I, which, given how it is defined, is updated during use of the bicycle along the path, may in turn be used by the system to determine one or more indicators representative of the cyclist's behavior over the space of time/distance in which the cyclist uses the bicycle.

For example, the system can be configured to determine an absolute behavior indicator of the cyclist given by the sum of the unique values representative of the impacts I that occur over time during use of the bicycle. Alternatively, or additionally, the system can be configured to determine an indicator of the average behavior of a cyclist, given by the average of the unique values representative of the impacts I occurring along the path/during the time of use of the bicycle by the cyclist.

Figure 4:
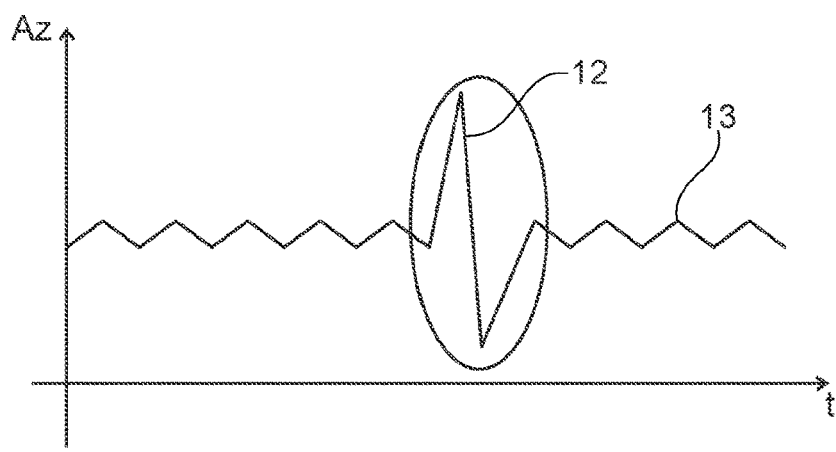
FIG. 4 is a schematic illustration of a possible trend in the vertical acceleration Az of a bicycle over time.

According to what was said previously, the system according to the invention is capable of distinguishing, in the vertical acceleration signal Az, the first portions 12 due to vertical impacts on the cyclist's part and the second portions 13 due instead to road quality (FIG. 4). The first portions 12 are analyzed with the aforesaid methods for estimating the cyclist's behavior. The second portions 13 may in turn be analyzed in order to define road quality. It should be noted that these two functions, both of which presuppose an analysis of the vertical acceleration signal Az, can be provided together or alternatively in the system according to the invention. According to the type of analysis performed, therefore, the system will be designed to estimate a cyclist's behavior or to estimate road quality, or both aspects.

Figure 8:
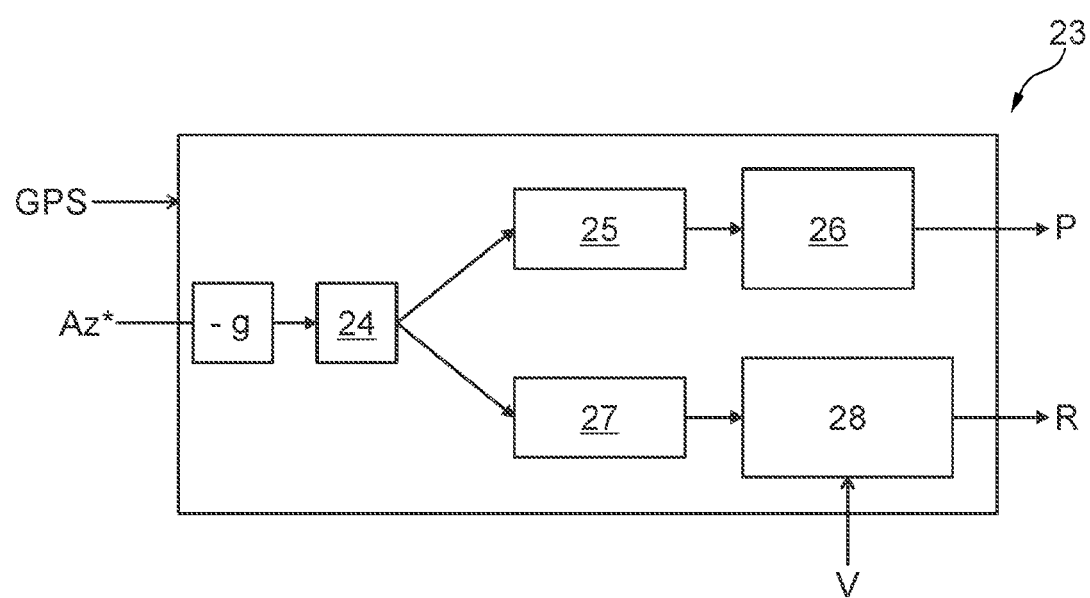
FIG. 8 is a block diagram of a module for analyzing the road quality of the system according to a possible embodiment.

In accordance with one embodiment, the system comprises a module for analyzing road quality 23 (FIG. 8) which receives at the input the second portions 13 of the signal representative of the vertical acceleration Az, indicated as Az* in FIG. 8. The system preferably further comprises a GPS module adapted to detect the spatial coordinates and send signals representative of the same, also supplied at the input of the module 23, which is thus capable, if necessary, of correlating the detections of the second portions of the vertical acceleration Az* to specific spatial coordinates, as well as to the bicycle speed, as will be seen below.

In accordance with a possible embodiment, the module 23 comprises a module 24 for calculating the absolute value of the signal representative of the vertical acceleration Az* (second portions), from which the value of gravitational acceleration will preferably be subtracted (−g). The module 23 further comprises a first band-pass filter 25, adapted to filter the signal in a frequency band characteristic of the peaks due to road bumps and a module 26 adapted to detect such peaks and to supply at the output a parameter representative of the presence/absence and/or amplitude of the peak P.

The module 23 further comprises a second band-pass filter 27, adapted to filter the signal in a frequency band different from the band of the first filter 25, and a module 28 for dynamically adjusting the signal, which analyzes the filtered signal representative of the vertical acceleration based on the bicycle speed v. It has indeed been verified that the detections of the vertical accelerations for the purposes of evaluating road quality changes according to the speed at which the bicycle is traveling along the road and thus requires a correction. The module 28 supplies at the output a parameter R indicative of the road surface, which can furthermore be correlated to the spatial position provided by the GPS, if this is provided for. It is thus possible to map the features of the road surface based on the path traveled by the bicycle, as well as its speed. In accordance with a possible embodiment, the module for analyzing road quality 23 is configured to be deactivated if at least one of the following conditions arises:

1) if one or more impacts among those previously described are detected;
2) if the roll angle is outside a predefined interval, representative of the amplitude of the left and right bending that the bicycle can undergo under normal conditions during use. For this purpose the system can comprise a sensor suitable for detecting the roll angle, for example an inertial sensor capable of detecting the angular roll speed $\omega_x$ and suitable for generating a signal representative of the same;
3) if the bicycle speed, obtainable by means of sensors already previously described, possibly filtered through a low-pass filter, is less than a predefined threshold. This corresponds to a situation where the bicycle is stationary or, for example, being pushed by hand by the cyclist;
4) if the time derivative of the wheel speed, possibly filtered in a band-pass filter, exceeds a predefined threshold value;
5) in general if one or more signals from the inertial sensors (acceleration along the axes x, y, or z or angular speed around the same axes) exceed a threshold value. Such conditions can be representative of critical dynamic conditions of the bicycle.

The parameters P, representative of the presence/absence of bumps or potholes and R, representative of the road surface quality, determined according to what was said above, can be exploited to obtain an overall indicator of road quality, for example based on the weighted sum of the parameters P and R.

The data collected and processed by the system can be transmitted to a remote server, which collects and analyzes them in turn. In order to carry out the transmission, the system can be provided with a data transmission module, or, preferably, it can exploit a mobile device, such as a cell phone or a smartphone of the cyclist, to transmit data. In such a case, the system can comprise a short-range transmission module, such as a Bluetooth® module. It should be noted that, in the event of coupling with the cyclist's mobile device, the GPS sensor of the latter can be exploited. Alternatively, the system can itself be provided with a GPS sensor.

Note that in this description and in the appended claims, the adaptive control system 1, as well as the elements indicated by the term "module", can be implemented by means of hardware devices (e.g. control units), by means of software or by means of a combination of hardware and software.

Furthermore, it should be pointed out that everything described up to now in terms of a system can be equally described as a step of a method for estimating the behavior of a cyclist on a bicycle and/or of the quality of a road along a path followed by said bicycle, likewise the subject matter of the present invention.

Therefore, each feature described as an action/function of a module or device is to be considered as disclosed and fully protectable, independently of the system, also as a step of a method.

The person skilled in the art may introduce numerous additions, changes or replacements, with functionally equivalent elements, to the described embodiments of a system for estimating the behavior of a cyclist on a bicycle and/or of the quality of a road along a path followed by the bicycle, without going beyond the scope of the appended claims.

The invention claimed is:

1. A system for estimating a behavior of a cyclist on a bicycle and a quality of a road along a path followed by said bicycle, comprising:
   a sensor configured to detect a vertical acceleration of the bicycle and to supply a signal representative of the vertical acceleration;
   a module for estimating vertical impacts configured to:
      receive as an input the signal representative of the vertical acceleration for a determined time;
      acknowledge one or more first portions of the signal representative of the vertical acceleration, containing peaks due to the vertical impacts, and one or more second portions of the signal representative of the vertical acceleration devoid of said peaks due to the vertical impacts,
      wherein said one or more first portions of the signal representative of the vertical acceleration are indicative of the cyclist's behavior, and said one or more second portions of the signal representative of the vertical acceleration are indicative of the quality of the road.

2. The system according to claim 1, and further comprising a sensor for detecting a longitudinal speed of the bicycle, suitable for supplying a signal representative of the longitudinal speed, wherein said module for estimating vertical impacts is further configured to receive as the input said signal representative of the longitudinal speed and to supply values representative of the vertical impacts along a vertical direction, determined based on said first portions of the signal representative of the vertical acceleration and on said signal representative of the longitudinal speed of the bicycle along said path followed by the bicycle.

3. The system according to claim 2, wherein said module for estimating vertical impacts, comprises:
   a module configured to calculate an absolute value of the first portions of the signal representative of the input vertical acceleration;
   a band-pass filter configured to filter in a predefined frequency band the signal from the module for calculating the absolute value;
   a peak detecting module, configured to detect peaks in the signal from the band-pass filter and to supply at an output said values representative of the vertical impacts along the vertical direction, correlated to said detected peaks, if the longitudinal speed is less than a threshold speed value;

a module for evaluating a shape coherence of the peaks, configured to:
compare a trend of each of the peaks of the first portions of the signal representative of the vertical acceleration detected by the peak detecting module, with predetermined trends representative of stored vertical impacts;
if the longitudinal speed is greater than or equal to said threshold speed value, supply at the output said values representative of the vertical impacts along the vertical direction, correlated to said peaks, if a coherence is detected among the peaks and the predetermined trends representative of the stored vertical impacts.

4. The system according to claim 1, further comprising a sensor configured to detect a longitudinal acceleration of the bicycle and to supply a signal representative of the longitudinal acceleration, and/or a sensor configured to detect a lateral acceleration of the bicycle and to supply a signal representative of the lateral acceleration, wherein the system further comprises a module for estimating longitudinal impacts and/or a module for estimating lateral impacts, wherein said modules for estimating longitudinal and/or lateral impacts are respectively configured to receive at the input a signal representative of the longitudinal acceleration and/or a signal representative of the lateral acceleration and to supply at the output values representative of impacts along a longitudinal direction and/or impacts along the lateral direction, obtained from said signals representative of the longitudinal acceleration and/or lateral acceleration.

5. The system according to claim 4, wherein said modules for estimating longitudinal/lateral impacts comprise:
a module for calculating an absolute value of the input signal representative of the longitudinal acceleration and/or lateral acceleration;
a band-pass filter configured to filter in a predetermined frequency band at the output the signal from the module for calculating the absolute value;
a peak detecting module configured to detect peaks in the output signal from the band-pass filter, identifying impacts along the longitudinal direction and/or lateral direction, and to supply said output values representative of the impacts along the longitudinal direction and/or along the lateral direction.

6. The system according to claim 1, and further comprising:
a sensor for detecting an angular speed of a wheel of the bicycle, suitable for generating a signal representative of the angular speed;
a sensor for detecting a pedal-thrust speed of the cyclist or an angular speed of a free-wheel mechanism connected to said wheel, suitable for generating a signal representative of the pedal-thrust speed of the cyclist or the angular speed of the free-wheel mechanism;
a module for estimating impacts on pedals configured to receive at the input said signals representative of the wheel angular speed and of the pedal-thrust angular speed or free wheel angular speed and to supply at the output values representative of the impacts on the pedals determined based on signals representative of the wheel angular speed and of the pedal-thrust angular speed or free wheel angular speed.

7. The system according to claim 6, wherein said module for estimating impacts on the pedals comprises:
a module for verifying a coherence between the wheel angular speed and pedal-thrust angular speed or free wheel angular speed, configured to compare said angular speeds of the wheel and of the pedal-thrust and/or of the free wheel and for determining whether the profiles thereof are compatible or incompatible with a traction condition of the pedals on the wheel;
a band-pass filter adapted to filter and derive over time a difference between the signals representative of the wheel angular speed and pedal-thrust angular speed and/or free wheel angular speed if an incompatibility of the profiles thereof with said traction condition is verified;
a peak detecting module configured to detect peaks in the output signal from the band-pass filter and to supply at the output said values representative of the impacts on the pedals correlated to a time derivative of the difference between the signals representative of the wheel angular speed and pedal-thrust angular speed and/or free wheel angular speed.

8. The system according to claim 1, further comprising:
a module for estimating a pitch angle of the bicycle and for supplying a signal representative of the pitch angle;
a module for estimating a degree of wheelies, configured to receive at the input said signal representative of the pitch angle and to supply at the output values representative of the wheelies, determined based on said signal representative of the pitch angle.

9. The system according to claim 8, wherein said module for estimating the degree of wheelies comprises:
a module for calculating an absolute value of the signal representative of the pitch angle;
a low-pass filter configured to filter said absolute value of the signal representative of the pitch angle;
a comparing module configured to compare the signal representative of the pitch angle filtered by the low-pass filter with a value of a threshold pitch angle and to supply said output values representative of the wheelie, correlated to a difference between the pitch angle filtered by the low-pass filter and the value of the threshold pitch angle, if the pitch angle is greater than the value of the threshold pitch angle.

10. The system according to claim 1, and further comprising a synthesis module configured to supply unique values representative of impacts, obtained based on a weighed sum according to weights of magnitudes representative of the impacts along a longitudinal direction and/or of impacts along a lateral direction and/or of the vertical impacts along the vertical direction and/or of impacts on pedals and/or of wheelies.

11. The system according to claim 1, wherein the system further comprises a module for analyzing the quality of the road configured to receive at the input the second portions of the signal representative of the vertical acceleration and said signal representative of the longitudinal speed and to supply at an output parameters representative of a presence/absence and/or of a size of road bumps or potholes, and/or parameters indicative of the quality of the road, obtained based on said second portions of the signal representative of the vertical acceleration correlated to said signal representative of a longitudinal speed of the bicycle.

12. The system according to claim 11, wherein the module for analyzing the quality of the road comprises:
a module for calculating an absolute value of the second portions of the signal representative of the vertical acceleration;
a first band-pass filter configured to filter, in a first predefined frequency band, the signal supplied by the module for calculating the absolute value;

a module for detecting peaks configured to detect peaks in the signal filtered by the first band-pass filter and to supply at the output said parameter representative of the presence/absence and/or amplitude of the peak, correlated to said peaks;

a second band-pass filter configured to filter in a second predefined frequency band different from the first predefined frequency band the signal supplied from the module for calculating the absolute value;

a module for dynamically adjusting the signal configured to supply at the output said parameters indicative of the road surface based on the signal representative of the longitudinal speed and the signal supplied from the second band-pass filter.

13. The system according to claim 1, and further comprising a long-range data transmission module for exchanging data with a remote server, and/or a short-range data transmission module for exchanging data with a mobile device comprising a long-range data transmission module for exchanging data with a remote server.

14. A method for estimating a behavior of a cyclist on a bicycle and a quality of a road along a path followed by said bicycle, comprising the steps of:

detecting a vertical acceleration of the bicycle;

generating a signal over time representative of said vertical acceleration;

acknowledging one or more first portions of the signal representative of the vertical acceleration, containing peaks due to vertical impacts, and one or more second portions of the signal representative of the vertical acceleration devoid of said peaks due to the vertical impacts, wherein said one or more first portions of the signal representative of the vertical acceleration are indicative of the cyclist's behavior, and said one or more second portions of the signal representative of the vertical acceleration are indicative of the quality of the road.

\* \* \* \* \*